(12) United States Patent
Yoon et al.

(10) Patent No.: US 11,209,683 B1
(45) Date of Patent: Dec. 28, 2021

(54) VEHICLE DISPLAY APPARATUS

(71) Applicant: Waymo LLC, Mountain View, CA (US)

(72) Inventors: Joongmin Yoon, Mountain View, CA (US); Scott Duncan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/908,278

(22) Filed: Jun. 22, 2020

(51) Int. Cl.
| | |
|---|---|
| *H01L 27/32* | (2006.01) |
| *H01L 27/02* | (2006.01) |
| *H01L 51/52* | (2006.01) |
| *G02F 1/1333* | (2006.01) |
| *G02F 1/13357* | (2006.01) |
| *B60K 35/00* | (2006.01) |

(52) U.S. Cl.
CPC ........ *G02F 1/133308* (2013.01); *B60K 35/00* (2013.01); *G02F 1/13338* (2013.01); *G02F 1/133605* (2013.01); *G02F 1/133606* (2013.01); *G02F 1/133608* (2013.01); *B60K 2370/1438* (2019.05); *B60K 2370/152* (2019.05); *G02F 1/133331* (2021.01)

(58) Field of Classification Search
CPC ... G01N 23/2251; H01J 37/073; H01J 37/244
See application file for complete search history.

(56) References Cited

U.S. PATENT DOCUMENTS

| | | | |
|---|---|---|---|
| 6,407,781 | B2 | 6/2002 | Kitada |
| 6,933,990 | B2 | 8/2005 | Park |
| 6,974,221 | B2 | 12/2005 | Wu et al. |
| 6,976,780 | B2 | 12/2005 | Lee et al. |
| 7,440,046 | B2 | 10/2008 | Kang et al. |
| 7,800,730 | B2 | 9/2010 | Kang et al. |
| 9,030,625 | B2 | 5/2015 | Lee et al. |
| 9,275,561 | B2 | 3/2016 | Kim et al. |
| 10,429,569 | B2 | 10/2019 | Wang et al. |

(Continued)

FOREIGN PATENT DOCUMENTS

CN 110955623 A 4/2020

OTHER PUBLICATIONS

Tae Young Kim et al., "Liquid crystal distortion in LCD panels and their solution using a conductive polymer", EOS/ESD 2008-2008 30th Electrical Overstress/Electrostatic Discharge Symposium;Date of Publication: Sep. 7-11, 2008.

(Continued)

*Primary Examiner* — Tracie Y Green
(74) *Attorney, Agent, or Firm* — McDonnell Boehnen Hulbert & Berghoff LLP

(57) ABSTRACT

A vehicle display apparatus is disclosed. The apparatus may comprise a housing configured to support a display cover and a backlight assembly configured to provide light to at least a portion of the display cover. The apparatus may also comprise a masking layer disposed between the backlight assembly and the display cover. Further, the apparatus may also include a first interface module having a connector body and a port extending from the connector body. The apparatus may also comprise a first support member disposed between the connector body of the first interface module and the backlight assembly.

20 Claims, 13 Drawing Sheets

(56) References Cited

U.S. PATENT DOCUMENTS

| | | | |
|---|---|---|---|
| 10,585,310 B2 | 3/2020 | Ryu et al. | |
| 2005/0228520 A1* | 10/2005 | Yeh | B60R 11/0211 |
| | | | 700/94 |
| 2012/0020054 A1 | 1/2012 | Shan et al. | |
| 2012/0169963 A1 | 7/2012 | Park | |
| 2013/0229359 A1 | 9/2013 | Wang et al. | |
| 2014/0168864 A1* | 6/2014 | Lin | G02F 1/133308 |
| | | | 361/679.01 |
| 2020/0348790 A1* | 11/2020 | Vampola | G09G 3/3406 |

OTHER PUBLICATIONS

Jonghoon Yi et al., "Study of optimal laser beam profile for laser induced thermal printing of organic film", Organic Light Emitting Materials and Devices XIII, vol. 7415; Date of Publication: Aug. 27, 2009.

* cited by examiner

VEHICLE DISPLAY APPARATUS

BACKGROUND

Autonomous vehicles use various computing systems to aid in the transport of passengers from one location to another. Some autonomous vehicles may operate in response to some initial input or continuous input from an operator, such as a pilot, driver, or passenger. Other systems, such as autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between. Thus, a vehicle with autonomous driving capability may receive input from passengers and display information to the passengers.

SUMMARY

Example implementations relate to vehicle display apparatus and systems. In one aspect, an example apparatus is provided. The apparatus may comprise a housing configured to support a display cover and a backlight assembly configured to provide light to at least a portion of the display cover. The apparatus may also comprise a masking layer disposed between the backlight assembly and the display cover. Further, the apparatus may include a first interface module having a connector body and a port extending from the connector body. The apparatus may also comprise a first support member disposed between the connector body of the first interface module and the backlight assembly.

In another aspect, another example apparatus is provided. The apparatus may comprise a housing to support a display cover and a backlight assembly to direct light to at least a portion of the display cover. The apparatus may also comprise a masking layer disposed between the display cover and the backlight assembly. Further, the apparatus may include a first interface module having a connector body and a port extending from the connector body. The apparatus may also comprise means for supporting the backlight assembly disposed between the connector body of the first interface module and the backlight assembly.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
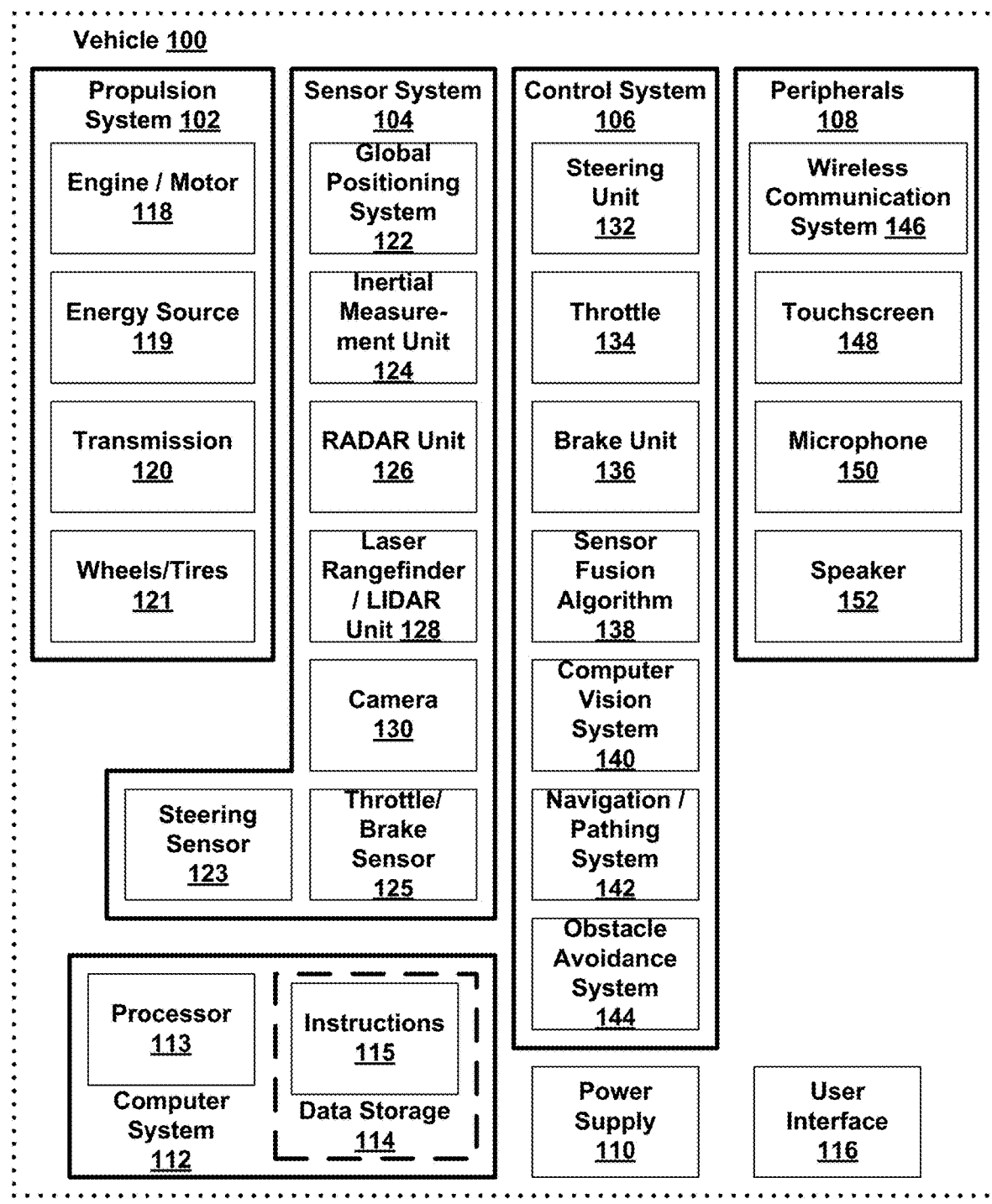
FIG. 1 is a functional block diagram illustrating a vehicle, according to example implementations.

Example apparatus and devices are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one. Yet further, the term "enabled" may mean active and/or functional, not necessarily requiring an affirmative action to turn on.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

Autonomous vehicles or vehicles operating in an autonomous mode may be equipped with one or more display devices to help improve an experience of a passenger using the vehicle for transportation. As an example, the display device may enable the passenger to interact with the autonomous vehicle. For example, the display device may provide information to the passenger about the systems of the vehicle including access to one or more vehicle controls and environment settings. In one implementation, the environmental settings may include controls for the seat that the passenger may be sitting in, air conditioning for vents that are proximate to where the passenger is sitting, heating controls for the seat, etc. In another implementation, the display device may provide passengers access to a radio/audio system of the vehicle, speaker controls for speakers of the whole vehicle and/or speakers that are proximate to the seat of the user. If, for example, the passenger wishes to lower the volume for speakers located near the passenger's seat, the passenger may use controls displayed on the display device to adjust the volume. The display apparatus may also allow a passenger to request assistance from a remote operator.

In one aspect, the present disclosure describes a vehicle display apparatus. The apparatus may comprise a housing configured to support a display cover and a backlight assembly configured to provide light to at least a portion of the display cover. The apparatus may also comprise a masking layer disposed between the backlight assembly and the display cover. Further, the apparatus may include a first interface module having a connector body and a port extending from the connector body. The apparatus may also comprise a first support member disposed between the connector body of the first interface module and the backlight assembly.

Example apparatus and systems within the scope of the present disclosure will now be described in greater detail. An example system may be implemented in or may take the form of an automobile, but other example systems can be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well.

Referring now to the figures, FIG. 1 is a functional block diagram illustrating an example vehicle 100, which may be configured to operate fully or partially in an autonomous mode. More specifically, the vehicle 100 may operate in an autonomous mode without human interaction through receiving control instructions from a computing system (i.e., vehicle control system). As such, the vehicle 100 may be configured to seek assistance in situations that require additional review.

As part of operating in the autonomous mode, the vehicle 100 may use sensors to detect and possibly identify objects of the surrounding environment to enable safe navigation. In some implementations, the vehicle 100 may also include subsystems that enable a driver to control operations of the vehicle 100.

As shown in FIG. 1, the vehicle 100 may include subsystems, such as a propulsion system 102, a sensor system 104, a control system 106, a peripheral(s) 108, a power supply 110, a computer system 112, a data storage 114, and a user interface 116. In other examples, the vehicle 100 may include more or fewer subsystems, which can each include multiple elements.

The subsystems and components of the vehicle 100 may be interconnected in various ways. In addition, functions of the vehicle 100 described herein can be divided into additional functional or physical components, or combined into fewer functional or physical components within implementations.

The propulsion system 102 may include component(s) operable to power the vehicle 100 and can include an engine/motor 118, an energy source 119, a transmission 120, and wheels/tires 121, among other possible components. For example, the engine/motor 118 may convert the energy source 119 into mechanical energy. As such, the engine/motor 118 can correspond to one or a combination of an internal combustion engine, an electric motor, steam engine, or Stirling engine, among other options. For instance, the propulsion system 102 may include multiple types of engines/motors, such as both a gasoline engine and an electric motor.

The energy source 119 represents a source of energy that may, in full or in part, power one or more systems of the vehicle 100 (e.g., the engine/motor 118). For instance, the energy source 119 can correspond to gasoline, diesel, other petroleum-based fuels, propane, other compressed gas-based fuels, ethanol, solar panels, batteries, and/or other sources of electrical power. In some implementations, the energy source 119 may include a combination of fuel tanks, batteries, capacitors, and/or flywheels.

The transmission 120 may transmit mechanical power from the engine/motor 118 to the wheels/tires 121 and/or other systems of the vehicle 100. As such, the transmission 120 may include a gearbox, a clutch, a differential, and a drive shaft, among other possible components. The drive shaft may include axles that connect to one or more of the wheels/tires 121.

The wheels/tires 121 of the vehicle 100 may have various configurations. For instance, the vehicle 100 may exist in a unicycle, a bicycle/motorcycle, a tricycle, or a car/truck four-wheel format, among other possible configurations. As such, the wheels/tires 121 may connect to the vehicle 100 in various ways and can exist in different materials, such as metal and rubber.

The sensor system 104 can include various types of sensors, such as a Global Positioning System (GPS) 122, an inertial measurement unit (IMU) 124, a radar 126, a laser rangefinder/LIDAR 128, a camera 130, a steering sensor 123, and a throttle/brake sensor 125, among others. The sensor system 104 may also include sensors configured to monitor internal systems of the vehicle 100 (e.g., an 02 monitor, a fuel gauge, an engine oil temperature, brakes wear).

The GPS 122 may include a transceiver operable to provide information regarding the position of the vehicle 100 with respect to the Earth. The IMU 124 may have a configuration that uses one or more accelerometers and/or gyroscopes and may sense position and orientation changes of the vehicle 100 based on inertial acceleration. For example, the IMU 124 may detect a pitch and yaw of the vehicle 100 while the vehicle 100 is stationary or in motion.

The radar 126 may represent systems configured to use radio signals to sense objects, including the speed and heading of the objects, within the local environment of the vehicle 100. As such, the radar 126 may include antennas configured to transmit and receive radio signals. In some implementations, the radar 126 may correspond to a mountable radar system configured to obtain measurements of the surrounding environment of the vehicle 100.

The laser rangefinder/LIDAR 128 may include one or more laser sources, a laser scanner, and one or more detectors, among other system components, and may operate in a coherent mode (e.g., using heterodyne detection) or in an incoherent detection mode. The camera 130 may include one or more devices (e.g., still camera or video camera) configured to capture images of the environment of the vehicle 100.

The steering sensor 123 may sense a steering angle of the vehicle 100, which may involve measuring an angle of the steering wheel or measuring an electrical signal representative of the angle of the steering wheel. In some implementations, the steering sensor 123 may measure an angle of wheels of the vehicle 100, such as detecting an angle of the wheels with respect to a forward axis of the vehicle 100. The steering sensor 123 may also be configured to measure a combination (or a subset) of the angle of the steering wheel, electrical signal representing the angle of the steering wheel, and the angle of the wheels of the vehicle 100.

The throttle/brake sensor 125 may detect the position of either the throttle position or brake position of the vehicle 100. For instance, the throttle/brake sensor 125 may measure the angle of both the gas pedal (throttle) and brake pedal or may measure an electrical signal that could represent, for instance, an angle of a gas pedal (throttle) and/or an angle of a brake pedal. The throttle/brake sensor 125 may also measure an angle of a throttle body of the vehicle 100, which may include part of the physical mechanism that provides modulation of energy source 119 to the engine/motor 118 (e.g., a butterfly valve or carburetor).

Additionally, the throttle/brake sensor 125 may measure a pressure of one or more brake pads on a rotor of the vehicle 100 or a combination (or a subset) of the angle of the gas pedal (throttle) and the brake pedal, the electrical signal representing the angle of the gas pedal (throttle) and brake pedal, the angle of the throttle body, and the pressure that at least one brake pad is applying to a rotor of the vehicle 100. In other embodiments, the throttle/brake sensor 125 may be configured to measure a pressure applied to a pedal of the vehicle, such as a throttle or brake pedal.

The control system 106 may include components configured to assist in navigating the vehicle 100, such as a steering unit 132, a throttle 134, a brake unit 136, a sensor fusion algorithm 138, a computer vision system 140, a navigation/pathing system 142, and an obstacle avoidance system 144. More specifically, the steering unit 132 may be operable to adjust the heading of the vehicle 100, and the throttle 134 may control the operating speed of the engine/motor 118 to control the acceleration of the vehicle 100. The brake unit 136 may decelerate the vehicle 100, which may involve using friction to decelerate the wheels/tires 121. In some implementations, the brake unit 136 may convert kinetic energy of the wheels/tires 121 to electric current for subsequent use by a system or systems of the vehicle 100.

The sensor fusion algorithm 138 may include a Kalman filter, Bayesian network, or other algorithms that can process data from the sensor system 104. In some implementations, the sensor fusion algorithm 138 may provide assessments based on incoming sensor data, such as evaluations of individual objects and/or features, evaluations of a particular situation, and/or evaluations of potential impacts within a given situation.

The computer vision system 140 may include hardware and software operable to process and analyze images in an effort to determine objects, environmental objects (e.g., stop lights, road way boundaries, etc.), and obstacles. As such, the computer vision system 140 may use object recognition, Structure from Motion (SFM), video tracking, and other algorithms used in computer vision, for instance, to recognize objects, map an environment, track objects, estimate the speed of objects, etc.

The navigation/pathing system 142 may determine a driving path for the vehicle 100, which may involve dynamically adjusting navigation during operation. As such, the navigation/pathing system 142 may use data from the sensor fusion algorithm 138, the GPS 122, and the maps, among other sources to navigate vehicle 100. The obstacle avoidance system 144 may evaluate potential obstacles based on sensor data and cause systems of vehicle 100 to avoid or otherwise negotiate the potential obstacles.

As shown in FIG. 1, the vehicle 100 may also include the peripherals 108, such as a wireless communication system 146, a touchscreen 148, a microphone 150, and/or a speaker 152. The peripherals 108 may provide controls or other elements for a user to interact with the user interface 116. For example, the touchscreen 148 may provide information to users of vehicle 100. The user interface 116 may also accept input from the user via the touchscreen 148. The peripherals 108 may also enable the vehicle 100 to communicate with devices, such as other vehicle devices.

The wireless communication system 146 may wirelessly communicate with one or more devices directly or via a communication network. For example, the wireless communication system 146 may use 3G cellular communication, such as CDMA, EVDO, GSM/GPRS, or 4G cellular communications, such as WiMAX or LTE. Alternatively, the wireless communication system 146 may communicate with a wireless local area network (WLAN) using WiFi or other possible connections.

The wireless communication system 146 may also communicate directly with a device using an infrared link, Bluetooth, or ZigBee, for example. Other wireless protocols, such as various vehicular communication systems, are possible within the context of the disclosure. For example, the wireless communication system 146 may include one or more dedicated short-range communications (DSRC) devices that could include public and/or private data communications between vehicles and/or roadside stations.

The vehicle 100 may further include the power supply 110 for powering components. The power supply 110 may include a rechargeable lithium-ion or lead-acid battery in some implementations. For instance, the power supply 110 may include one or more batteries configured to provide electrical power. The vehicle 100 may also use other types of power supplies. In an example implementation, the power supply 110 and the energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as the data storage 114. In some implementations, the computer system 112 may represent a plurality of computing devices that may serve to control individual components or subsystems of the vehicle 100 in a distributed fashion.

In some implementations, the data storage 114 may contain the instructions 115 (e.g., program logic) executable by the processor 113 to execute various functions of the vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The vehicle 100 may include the user interface 116 for providing information to or receiving input from a user of the vehicle 100. The user interface 116 may control or enable control of content and/or the layout of interactive images that could be displayed on the touchscreen 148. Further, the user interface 116 may include one or more input/output devices within the set of the peripherals 108, such as the wireless communication system 146, the touchscreen 148, the microphone 150, and the speaker 152.

The computer system 112 may control the function of the vehicle 100 based on inputs received from various subsystems (e.g., the propulsion system 102, the sensor system 104, and the control system 106), as well as from the user interface 116. For example, the computer system 112 may utilize input from the sensor system 104 in order to estimate the output produced by the propulsion system 102 and the control system 106. Depending upon the embodiment, the computer system 112 may be operable to monitor many aspects of the vehicle 100 and its subsystems. In some embodiments, the computer system 112 may disable some or all functions of the vehicle 100 based on signals received from the sensor system 104.

The components of the vehicle 100 may be configured to work in an interconnected fashion with other components within or outside their respective systems. For instance, in an example embodiment, the camera 130 may capture a plurality of images that could represent information about a state of an environment of the vehicle 100 operating in an autonomous mode. The state of the environment may include parameters of the road on which the vehicle is operating. For example, the computer vision system 140 may be able to recognize the slope (grade) or other features based on the plurality of images of a roadway.

Additionally, the combination of the GPS 122 and the features recognized by the computer vision system 140 may be used with map data stored in the data storage 114 to determine specific road parameters. Further, the radar unit 126 may also provide information about the surroundings of the vehicle. In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle 100 may have lasers or other optical sensors configured to sense objects in a field of view of the vehicle. The computer system 112 may use the outputs from the various sensors to determine information about objects in a field of view of the vehicle, and may determine distance and direction information to the various objects. The computer system 112 may also determine whether objects are desirable or undesirable based on the outputs from the various sensors.

Although FIG. 1 shows various components of the vehicle 100, i.e., the wireless communication system 146, the computer system 112, the data storage 114, and the user interface 116, as being integrated into the vehicle 100, one or more of these components may be mounted or associated separately from the vehicle 100. For example, the data storage 114 may, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
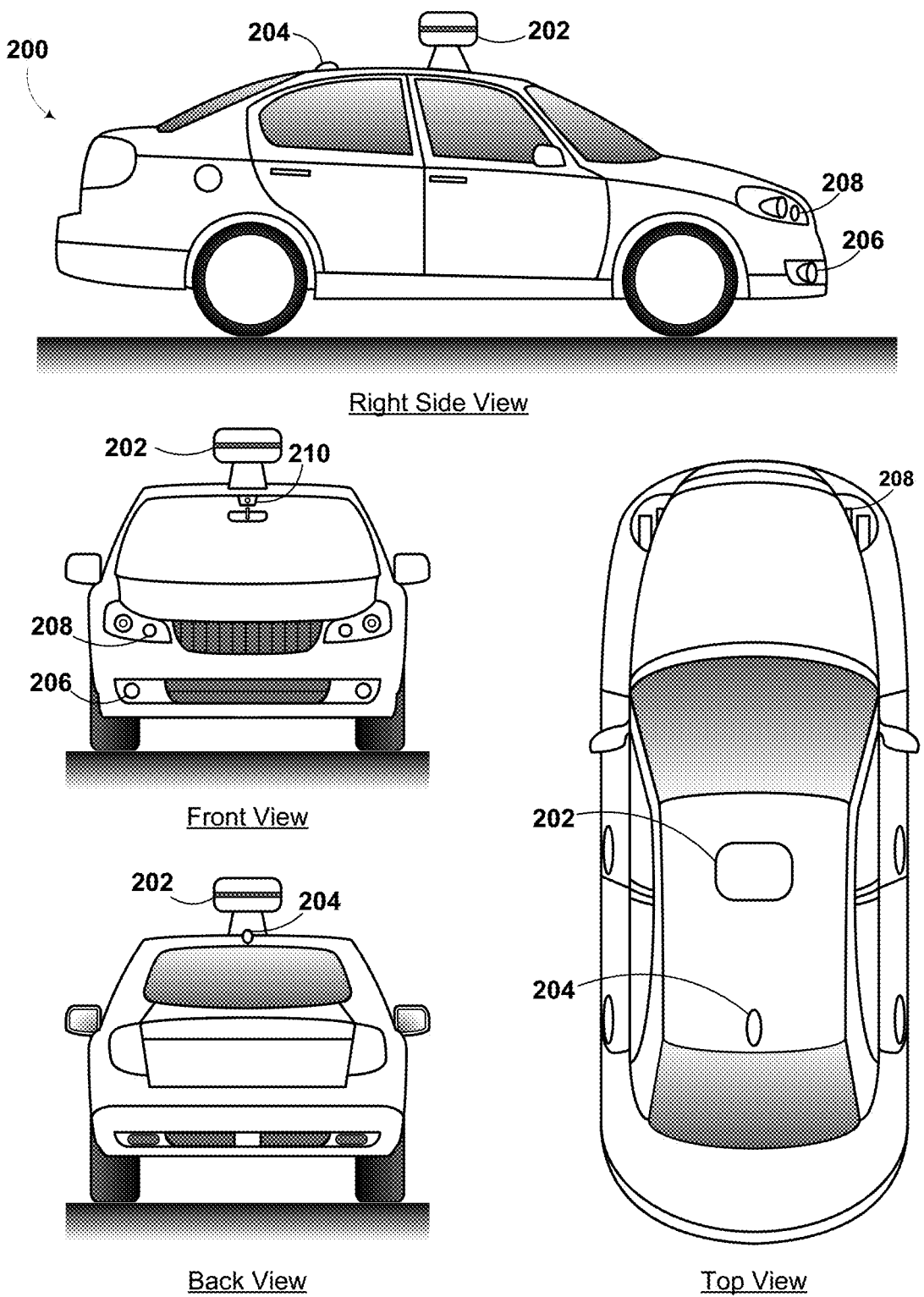
FIG. 2 is a conceptual illustration of a physical configuration of a vehicle, according to example implementations.

FIG. 2 depicts an example physical configuration of the vehicle 200, which may represent one possible physical configuration of the vehicle 100 described in reference to FIG. 1. Depending on the embodiment, the vehicle 200 may include a sensor unit 202, a wireless communication system 204, a radio unit 206, deflectors 208, and a camera 210, among other possible components. For instance, the vehicle 200 may include some or all of the elements of components described in FIG. 1. Although the vehicle 200 is depicted in FIG. 2 as a car, the vehicle 200 can have other configurations within examples, such as a truck, a van, a semi-trailer truck, a motorcycle, a golf cart, an off-road vehicle, robotic device, or a farm vehicle, among other possible examples.

The sensor unit 202 may include one or more sensors configured to capture information of the surrounding environment of the vehicle 200. For example, the sensor unit 202 may include any combination of cameras, radars, LIDARs, range finders, radio devices (e.g., Bluetooth and/or 802.11), and acoustic sensors, among other possible types of sensors.

In some implementations, the sensor unit 202 may include one or more movable mounts operable to adjust the orientation of sensors in the sensor unit 202. For example, the movable mount may include a rotating platform that can scan sensors so as to obtain information from each direction around the vehicle 200. The movable mount of the sensor unit 202 may also be moveable in a scanning fashion within a particular range of angles and/or azimuths.

In some implementations, the sensor unit 202 may include mechanical structures that enable the sensor unit 202 to be mounted atop the roof of a car. Additionally, other mounting locations are possible within examples.

The wireless communication system 204 may have a location relative to the vehicle 200 as depicted in FIG. 2, but can also have different locations within implementations. The wireless communication system 200 may include one or more wireless transmitters and one or more receivers that may communicate with other external or internal devices. For example, the wireless communication system 204 may include one or more transceivers for communicating with a user's device, other vehicles, and roadway elements (e.g., signs, traffic signals), among other possible entities. As such, the vehicle 200 may include one or more vehicular communication systems for facilitating communications, such as dedicated short-range communications (DSRC), radio frequency identification (RFID), and other proposed communication standards directed towards intelligent transport systems.

The camera 210 may have various positions relative to the vehicle 200, such as a location on a front windshield of the vehicle 200. As such, the camera 210 may capture images of the environment of the vehicle 200. As illustrated in FIG. 2, the camera 210 may capture images from a forward-looking view with respect to the vehicle 200, but other mounting locations (including movable mounts) and viewing angles of the camera 210 are possible within implementations. In some examples, the camera 210 may correspond to one or more visible light cameras. Alternatively or additionally, the camera 210 may include infrared sensing capabilities. The camera 210 may also include optics that may provide an adjustable field of view.

Figure 3A:
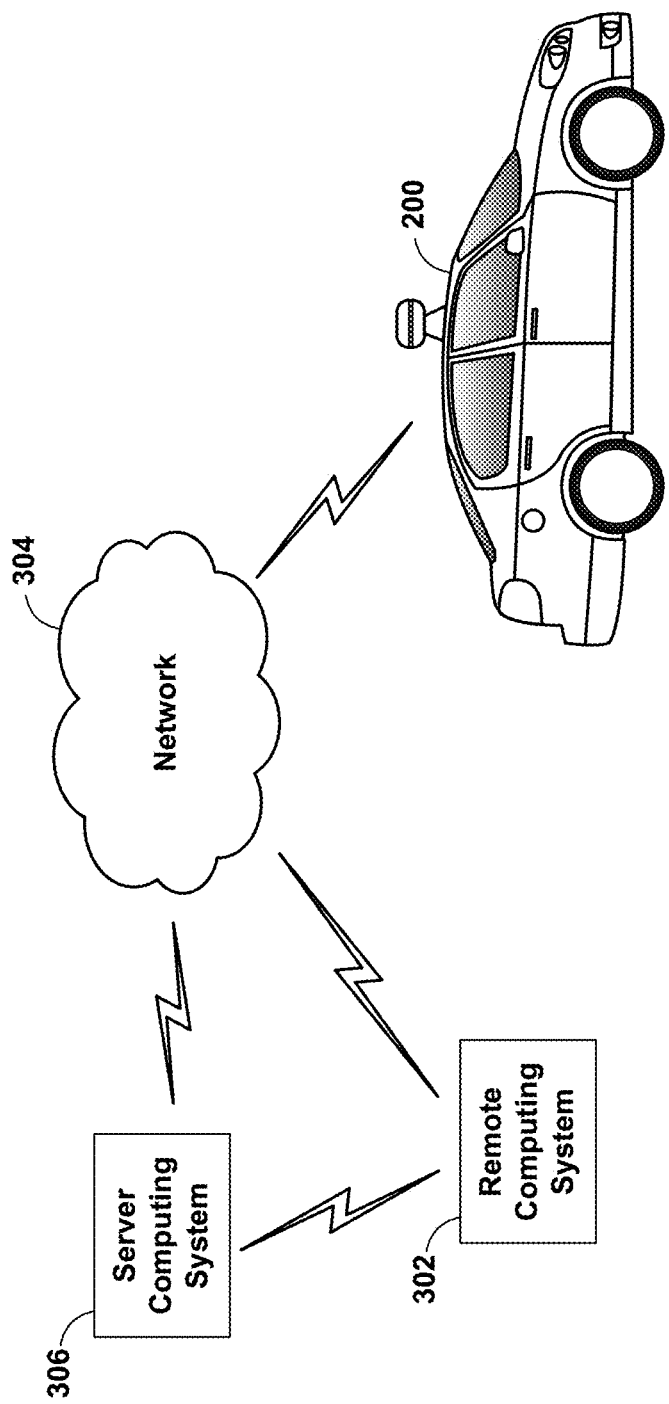
FIG. 3A is a conceptual illustration of wireless communication between various computing systems related to an autonomous vehicle, according to example implementations.

FIG. 3A is a conceptual illustration of wireless communication between various computing systems related to an autonomous vehicle, according to example implementations. Particularly, a remote computing system 302, a server computing system 306, and a vehicle 200 may communicate wireless via network 304.

The vehicle 200 may transport passengers or objects between locations, and may take the form of any one or more of the vehicles discussed above. When operating in an autonomous mode, the vehicle 200 may navigate with or without passengers enabling the vehicle 200 to pick up and drop off passengers between desired destinations.

The remote computing system 302 may represent any type of device related to remote assistance techniques, including but not limited to those described herein. Within examples, the remote computing system 302 may represent any type of device configured to (i) receive information related to the vehicle 200, (ii) provide an interface through which a human operator can in turn perceive the information and input a response related to the information, and (iii) transmit the response to the vehicle 200 or to other devices. As such, the remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

The remote computing system 302 may include one or more subsystems and components similar or identical to the subsystems and components of the vehicle 200. At a minimum, the remote computing system 302 may include a processor configured for performing various operations described herein. In some implementations, the remote computing system 302 may also include a user interface that includes input/output devices, such as a touchscreen and a speaker. Other examples are possible as well.

The position of the remote computing system 302 can vary within examples. For instance, the remote computing system 302 may have a remote position from the vehicle 200 utilizing wireless communication via the network 304. In another example, the remote computing system 302 may correspond to a computing device within vehicle 200 that is physically separate from the vehicle 200, but with which a human operator can interact while as a passenger or driver of the vehicle 200. In some examples, the remote computing system 302 may be a computing device with a touchscreen operable by the passenger of vehicle 200.

In some implementations, operations described herein that are performed by remote the computing system 302 may be additionally or alternatively performed by the vehicle 200 (i.e., by any system(s) or subsystem(s) of vehicle 200). In other words, the vehicle 200 may be configured to provide a remote assistance mechanism with which a driver or passenger of the vehicle can interact.

The network 304 represents infrastructure that can enable wireless communication between the remote computing system 302 and the vehicle 200. The network 304 also can enable wireless communication between a server computing system 306 and the remote computing system 302, and between the server computing system 306 and the vehicle 200.

The server computing system 306 may be configured to wirelessly communicate with the remote computing system 302 and the vehicle 200 via the network 304 (or perhaps directly with the remote computing system 302 and/or the vehicle 200). The server computing system 306 may represent any computing device configured to receive, store, determine, and/or send information relating to the vehicle 200 and the remote assistance thereof. As such, the server computing system 306 may be configured to perform any operation(s), or portions of such operation(s), that is/are described herein as performed by the remote computing system 302 and/or the vehicle 200. Some implementations of wireless communication related to remote assistance may utilize the server computing system 306, while others may not.

The server computing system 306 may include one or more subsystems and components similar or identical to the subsystems and components of the remote computing system 302 and/or the vehicle 200, such as a processor configured for performing various operations described herein, and a wireless communication interface for receiving information from, and providing information to, the remote computing system 302 and the vehicle 200. The various systems described above may perform various operations. These operations and related features will now be described.

In some examples, a remote computing system (e.g., the remote computing system 302 or the server computing system 306) may operate in one of two modes. The first of these modes may serve, in essence, as a means for a human operator (of the vehicle and/or the remote computing system) to provide remote assistance support for the vehicle, particularly in scenarios in which occupancy detection or passenger identification confidence is low. The remote computing system may enable a human operator to provide this support in near real-time or less frequently than real-time.

The second of these two modes may serve, at a minimum, as a means for keeping the human operator alert. The human operator may be a passenger or driver of the vehicle, or may be a third party located remotely from the vehicle but tasked with the responsibility of providing remote assistance to the vehicle (and possibly to other vehicles as well). Regardless of who the human operator is, it is desirable to keep the human operator alert so that the human operator can provide optimal remote assistance with minimal delay.

For instance, there may be scenarios in which the vehicle may not have requested remote assistance in a certain amount of time (e.g., one hour), and therefore the human operator tasked with providing remote assistance to the vehicle may not have taken any remote assistance action in that amount of time, which may be long enough where the human operator may become fatigued or otherwise less attentive than desirable. In these and other types of possible scenarios, it may be desirable to periodically prompt the human operator during this time, via the remote computing system, with alertness data to keep them alert. The alertness data may take various forms, such as archived images, audio, or video having confirmed or unconfirmed object identifications, also including generated natural-language questions regarding the confirmed or unconfirmed object identifications.

The remote assistance tasks may also include the human operator providing an instruction to control operation of the vehicle (e.g., instruct the vehicle to travel to a particular destination associated with an identified passenger). In some scenarios, the vehicle itself may control its own operation based on the human operator's feedback related to the identification of the object. For instance, upon receiving a confirmation that the occupancy of the vehicle meets a desired occupancy, the vehicle control system may cause the vehicle to safely transport the passengers to a requested destination.

Figure 3B:
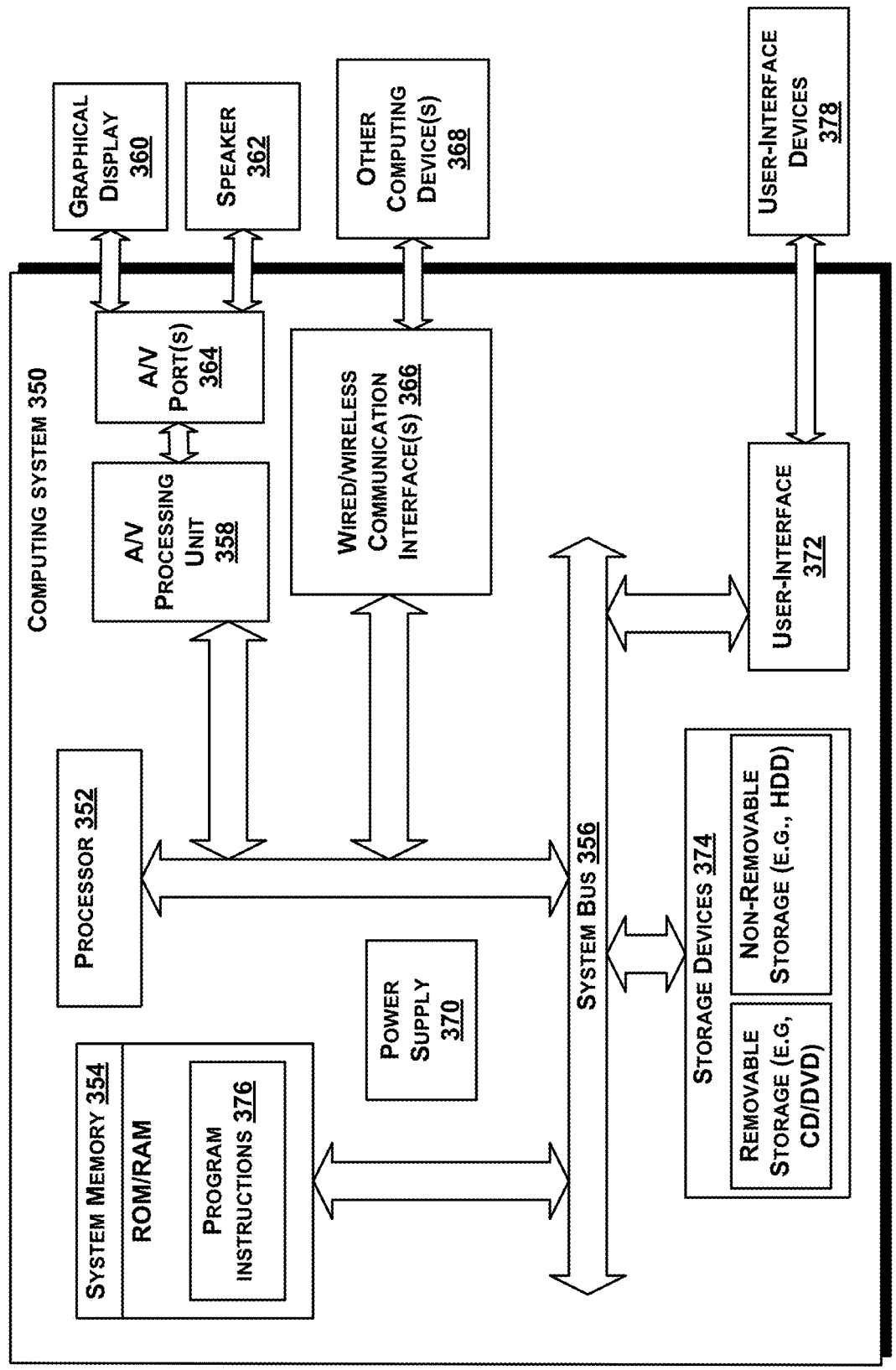
FIG. 3B shows a simplified block diagram depicting components of a computing system, according to example implementations.

FIG. 3B shows a simplified block diagram depicting example components of an example computing system 350. One or both of the remote computing system 302, or the server computing system 306, may take the form of the computing system 350.

The computing system 350 may include at least one processor 352 and a system memory 354. In an example embodiment, the computing system 350 may include a system bus 356 that can communicatively connect the processor 352 and the system memory 354, as well as other components of the computing system 350. Depending on the desired configuration, the processor 352 can be any type of processor including, but not limited to, a microprocessor (μP), a microcontroller (μC), a digital signal processor (DSP), or any combination thereof. Furthermore, the system memory 354 can be of any type of memory now known or later developed including but not limited to volatile memory (such as RAM), non-volatile memory (such as ROM, flash memory, etc.) or any combination thereof.

The computing system 350 may include various other components. For example, the computing system 350 may include an A/V processing unit 358 for controlling a graphical display 360 and a speaker 362 (via the A/V port 364), one or more communication interfaces 366 for connecting to other computing devices 368, and a power supply 370.

The graphical display 360 may be arranged to provide a visual depiction of various input regions provided by a user-interface module 372. For example, the user-interface module 362 may be configured to provide a user-interface, and the graphical display 360 may be configured to provide a visual depiction of the user-interface. The user-interface module 372 may be further configured to receive data from and transmit data to (or be otherwise compatible with) one or more user-interface devices 378.

Furthermore, the computing system 350 may also include one or more data storage devices 374, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital video disk (DVD) drives, solid state drives (SSD), and/or any other storage device now known or later developed.

Computer storage media can include volatile and non-volatile, removable and non-removable media implemented in any method or technology for storage of information, such as computer readable instructions, data structures, program modules, or other data. For example, the computer storage media may take the form of RAM, ROM, EEPROM, flash memory or other memory technology, CD-ROM, digital video disk (DVD) or other optical storage, magnetic cassettes, magnetic tape, magnetic disk storage or other magnetic storage devices, or any other medium now known or later developed that can be used to store the desired information and which can be accessed by the computing system 300.

Figure 4:
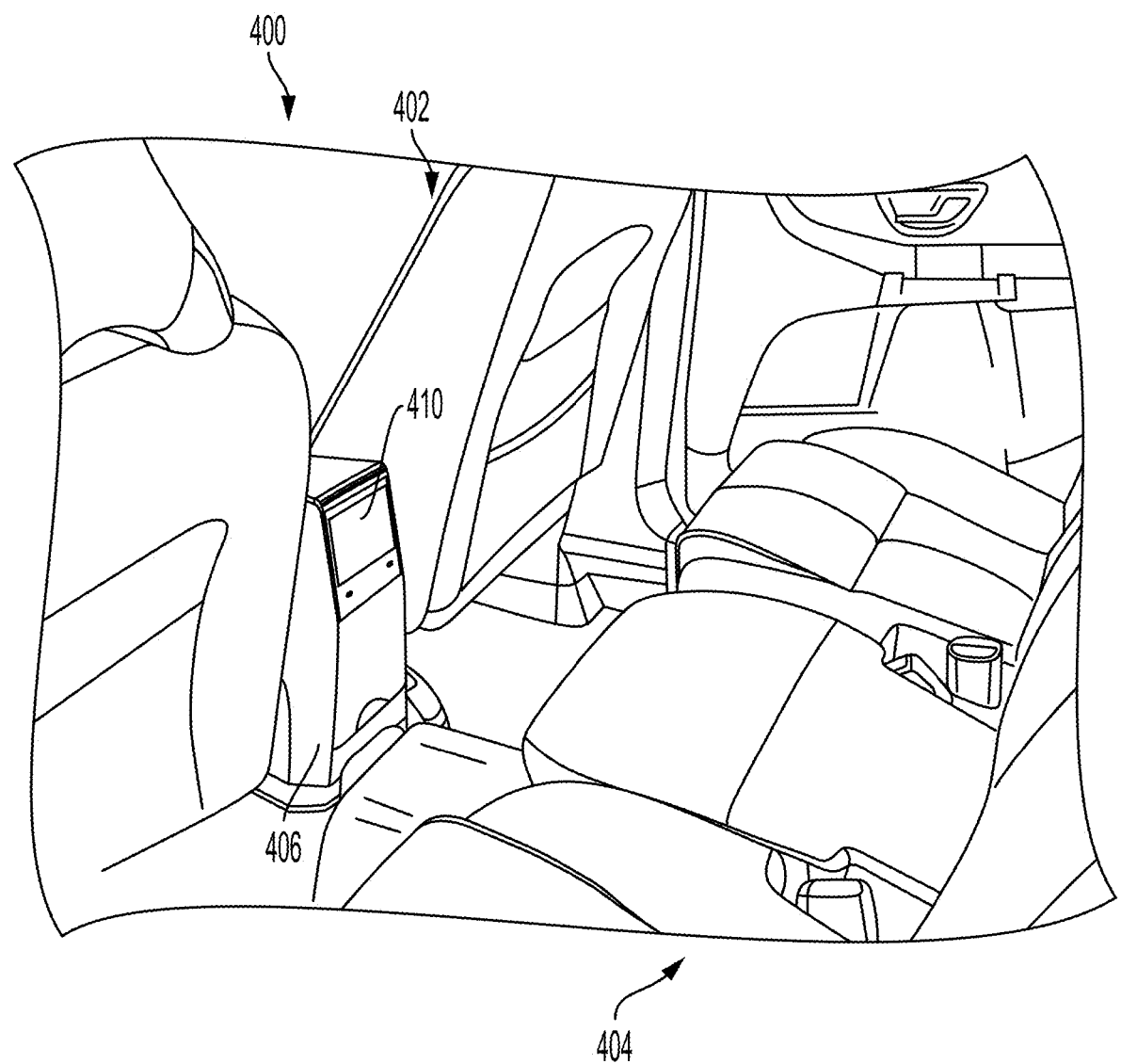
FIG. 4 is a conceptual illustration of an interior of a vehicle, according to example implementations.

According to an example embodiment, the computing system 350 may include program instructions 376 that are stored in the system memory 354 (and/or in another data-storage medium) and executable by the processor 352 to facilitate the various functions described herein including, but not limited to, those functions described with respect to FIG. 4. Although various components of the computing system 350 are shown as distributed components, it should be understood that any of such components may be physically integrated and/or distributed according to the desired configuration of the computing system.

Figure 5:
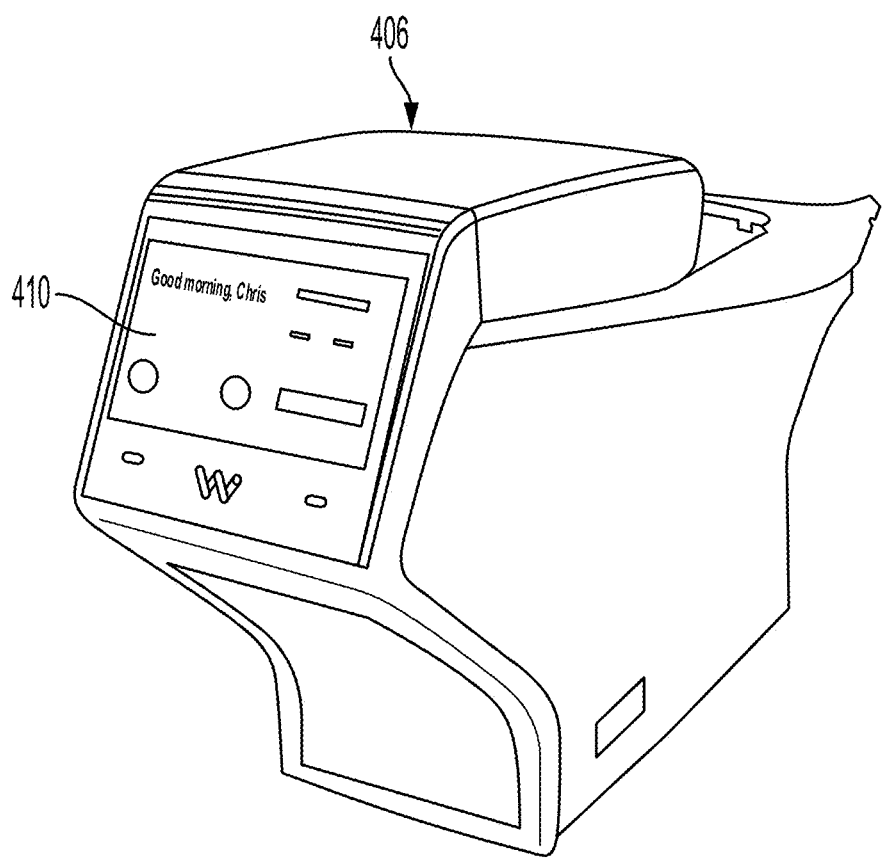
FIG. 5 is a conceptual illustration of a console of a vehicle, according to example implementations.

FIG. 4 is a conceptual illustration of an interior of an autonomous vehicle, according to example implementations. As shown in FIG. 4, the interior of vehicle 400 may include front seats 402, back seats 404, and a console 406 positioned between the front seats 402. As shown in FIGS. 4 and 5, the console 406 may include a display unit 410 to enable passengers to interact with the systems of the autonomous vehicle. For example, when a passenger sits in a back seat of the vehicle, the display unit 410 may be positioned in front of the passenger so that the passenger can easily view and access the display unit 410. However, it is to be understood that the display unit 410 may be located in other areas of the vehicle. Further, the vehicle may include one or more additional display units that may be mounted in the interior of the vehicle 400 to allow one or more passengers of the vehicle to interact with the additional display units.

The display unit 410 may be configured to communicate with one or more systems of the vehicle including the global positional (GPS) system 122, the wireless communication system 146, the camera system 130, an audio system, a heating and air conditioning system, and an instruments system. The display unit 410 may have at least one user interface that includes one or more input/output devices, such as a touchscreen and/or a microphone. The user interface of the display unit 410 may be configured to enable a passenger to input information into the autonomous vehicle and to control the layout of the interactive images of the user interface. For example, the passenger may use the user interface to input a destination (e.g., 123 Oak Street) for the vehicle. The user interface may also allow the passenger to increase audio volume, decrease audio volume, brighten interior lighting, lower interior lighting, adjust seating, and/or the like.

The display unit 410 may also be configured to provide information about the systems of the vehicle. For example, the display unit 410 may display navigation information, such as maps, current vehicle position, and a navigation route between a present location of the vehicle and a selected destination. The display unit 410 may also display audio and video elements of a multi-media device and display the controls for adjusting the seats of the vehicle. Further, the display unit 410 may include one or more charging ports to enable a passenger to charge a device and to allow the device to communicate with the vehicle systems.

Figure 6:
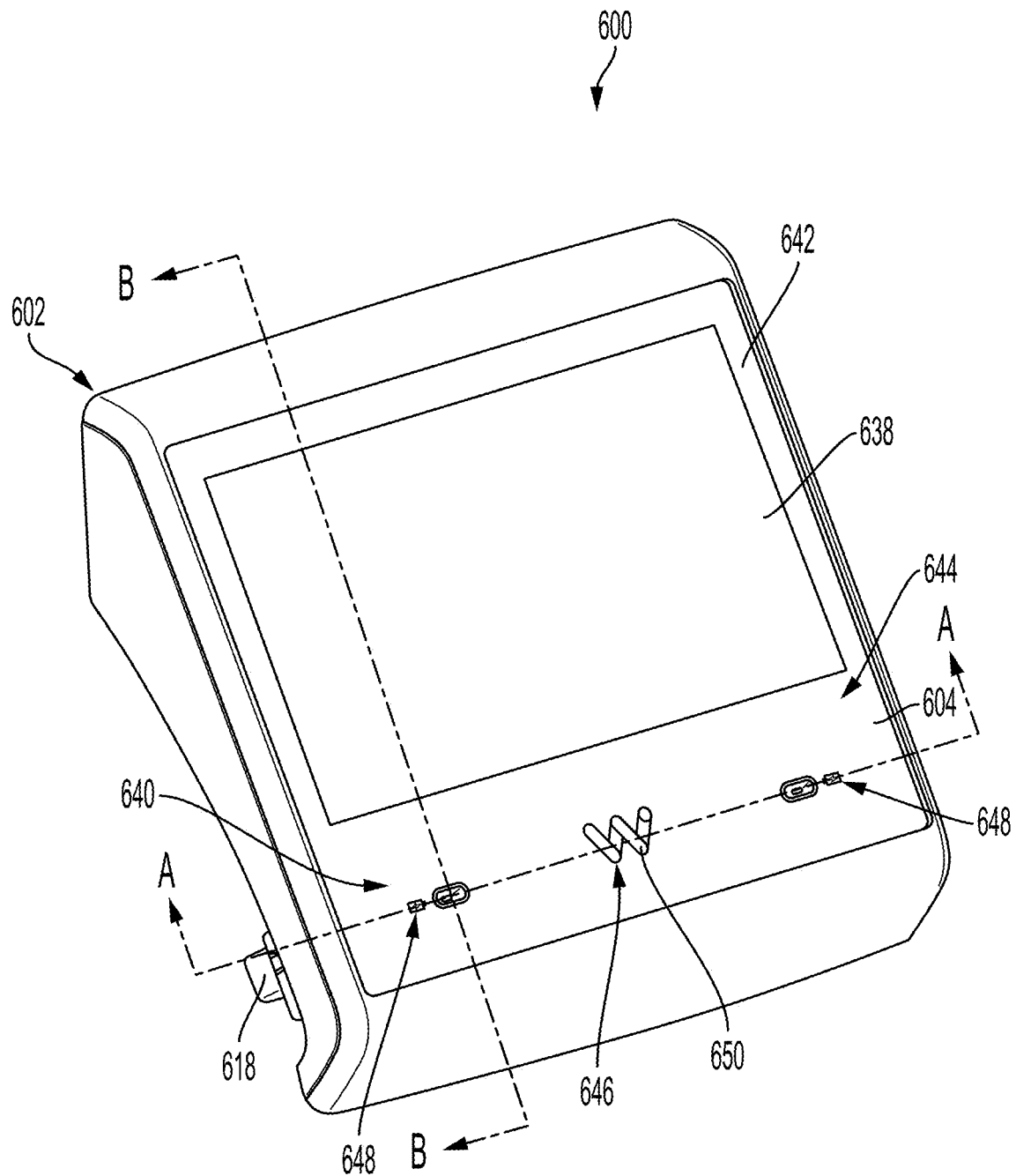
FIG. 6 is a perspective view illustrating a display apparatus, according to example implementations.
Figure 7:
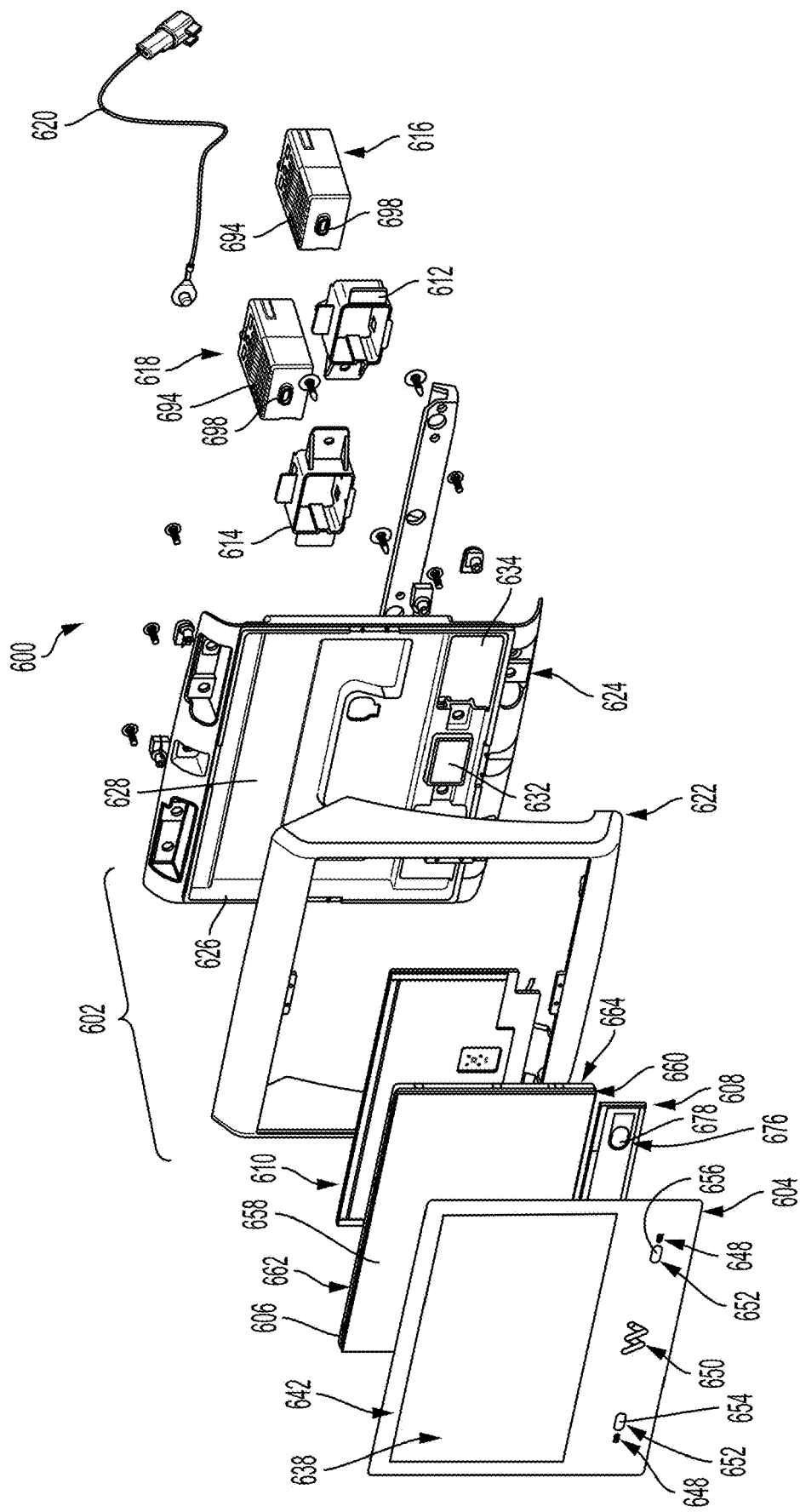
FIG. 7 is an exploded view of the display apparatus of FIG. 6, according to example implementations.

FIG. 6 is a perspective view of a display unit 600 according to exemplary implementations. An exploded view of the display unit 600 is shown in FIG. 7. The display unit 600 may be configured to enable a passenger to input information into a vehicle and to provide the passenger with information about the systems of the vehicle. The display unit 600 may include a housing 602, a display cover or cover glass 604, a display assembly 606, a panel or light guide assembly 608, a printed circuit board (PCB) 610, brackets 612 and 614, interface modules 616 and 618, and a grounding wire 620.

The housing 602 of the display unit 600 may be formed from multiple pieces that are joined together. In other embodiments, the housing 602 may be formed as a single piece construction. The housing 602 may be constructed using a variety of manufacturing processes, such as, for example, injection molding and/or vacuum forming. In addition, the housing 602 may be formed from a number of materials, including, but not limited to, plastic, metal, glass, rubber, ceramic, and/or a combination thereof.

Figure 8:
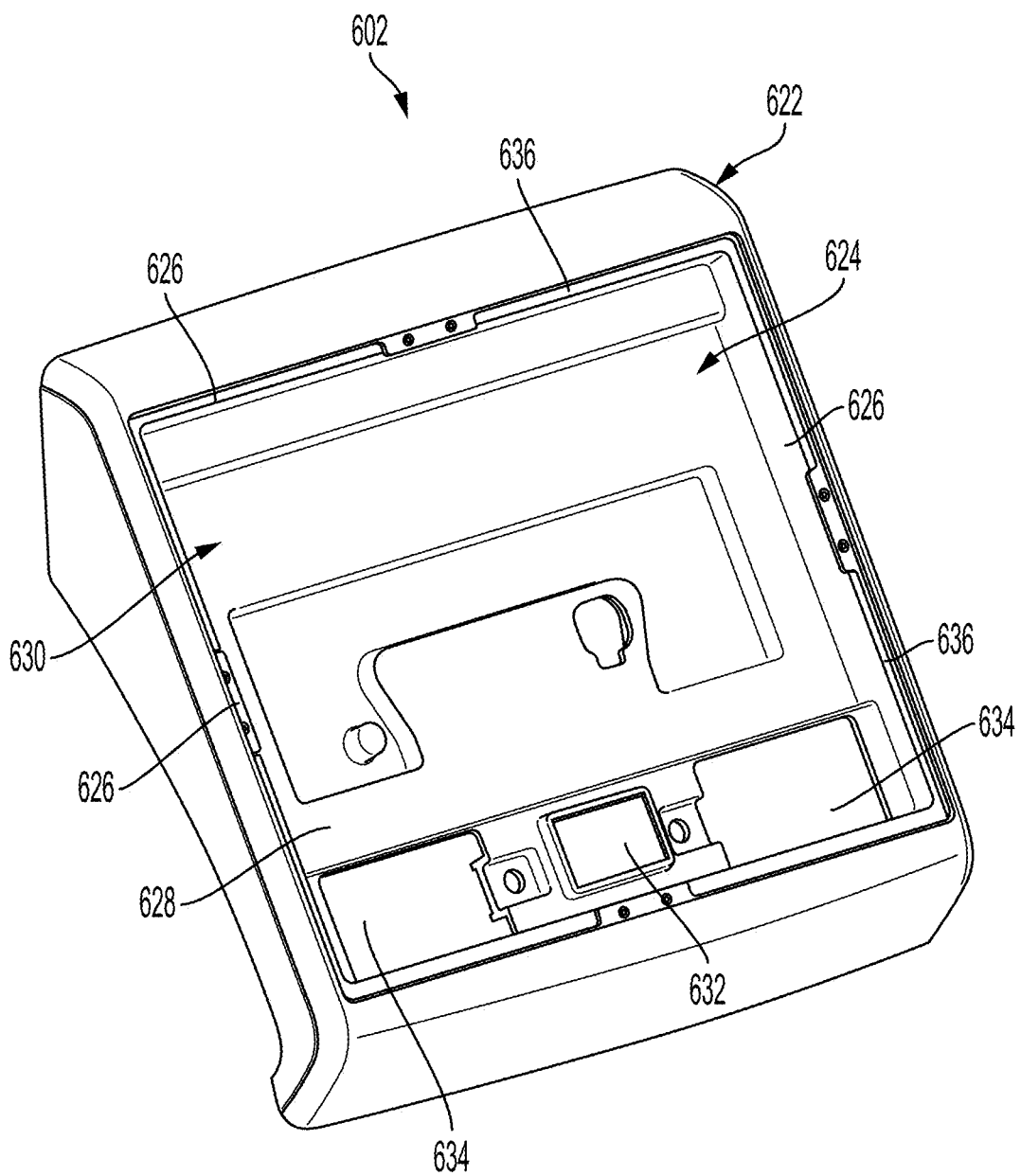
FIG. 8 is a perspective view illustrating a housing of the display apparatus of FIG. 6, according to example implementations.
Figure 9:
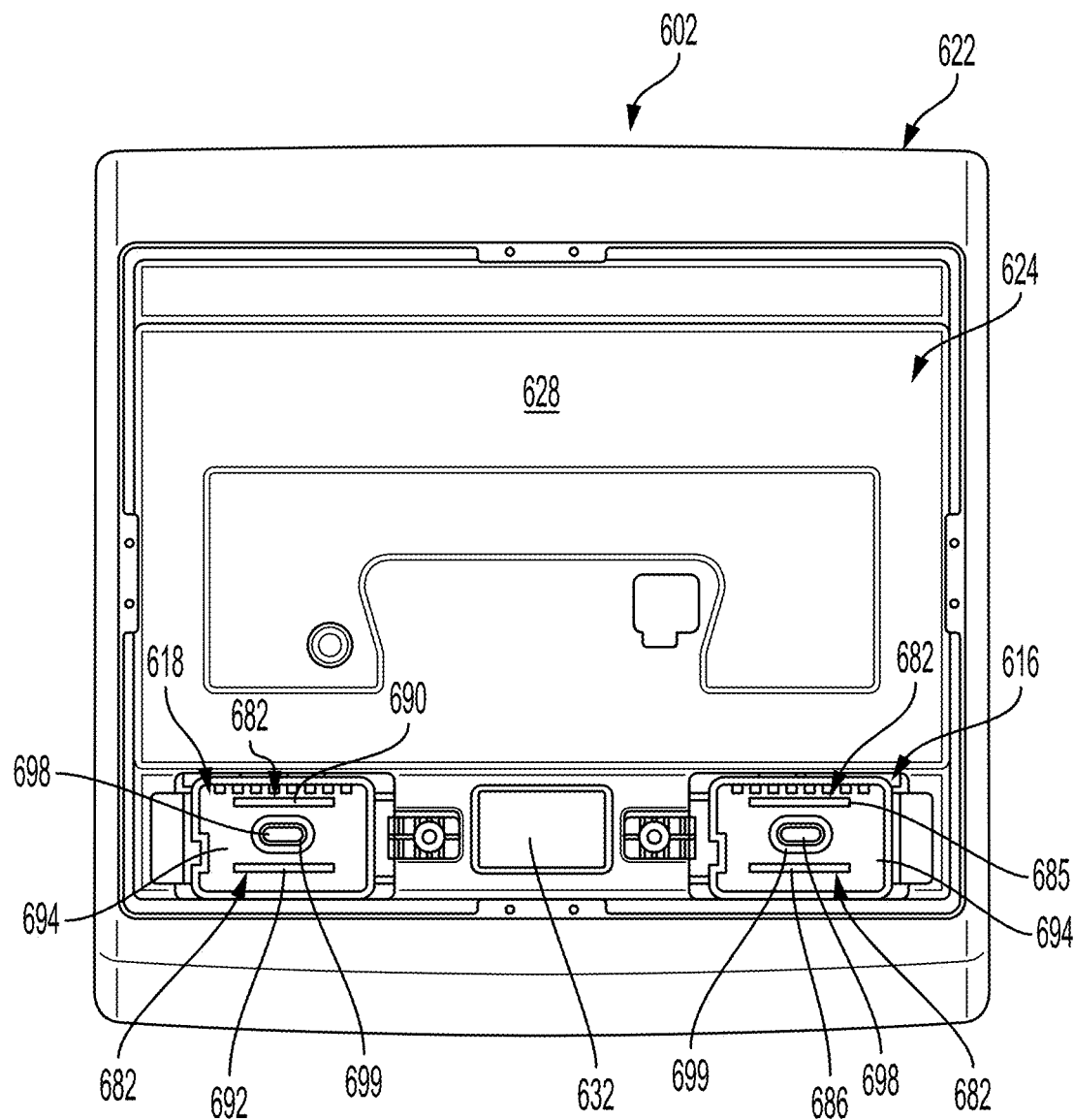
FIG. 9 is a front view illustrating interface modules mounted to a housing of the display apparatus of FIG. 6, according to example implementations.

As shown in FIGS. 8 and 9, the housing 602 of the display unit 600 may include a frame 622 and a back cover 624. The back cover 624 includes sidewalls 626 and a backwall 628. The sidewalls 626 of the back cover 624 extend from the backwall 628 to form a space or cavity 630 sized to accommodate the display assembly 606, the panel assembly 608, and the PCB 610. In exemplary embodiments, the backwall 628 of the back cover 624 may include a pad or support region 632 configured to support the panel assembly 608. The backwall 628 may also include openings 634 to accommodate electrical components that may interface with the vehicle systems, such as the interface modules 616 and 618. Further, the backwall 628 may include a ledge or ridge 636 defined in the sidewalls 626 of the back cover 624 that supports the display cover 604 of the display unit 600.

Referring now to FIGS. 7 and 8, the display cover 604 of the display unit 600 may be configured to protect the display assembly 606 and the panel assembly 608. The display cover 604 may be mounted or attached to the back cover 624 of the housing 602. In exemplary embodiments, the display cover 604 may be mounted on the ledge 636 defined in the sidewalls 626 of the back cover 624. The display cover 604 may include a transparent substrate and may be formed in whole or in part from glass, plastics, polymers, and other suitable material. In some embodiments, the display cover 604 may include regions having a transparent substrate and other regions having a non-transparent substrate.

Figure 10:
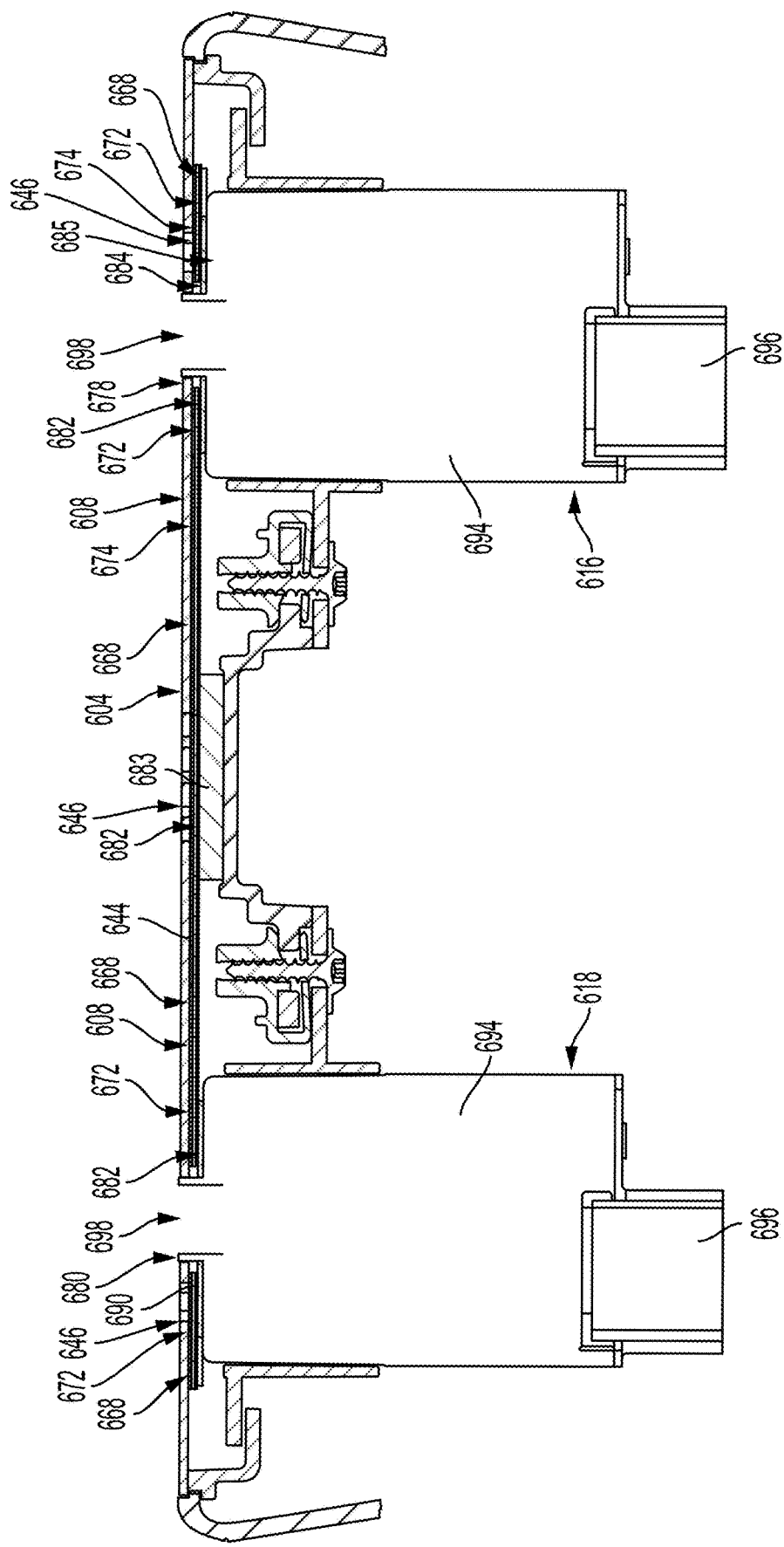
FIG. 10 is a cross-sectional view of the display apparatus of FIG. 6 taken along the line A-A, according to example implementations.

As shown in FIG. 6, the display cover 604 may include an active region 638 (e.g., a display region), such as a rectangular central region configured to display graphical information. The display cover 604 may also include an inactive region 640 (e.g., a non-display region) formed around the active region 638 to define a border or peripheral area 642. As shown in FIG. 10, an opaque masking layer 644 (e.g., a light shielding layer) may be disposed on a back surface of the display cover 604 in regions that correspond to the inactive regions 640 to substantially block or prevent light from passing through the inactive regions 640 of the display cover 604. The opaque masking layer 644 may be composed of a colored coating, ink or resin, such as a black or white coating. In exemplary embodiments, a black masking layer may be disposed on the display cover 604 in the regions corresponding to inactive regions 640 to define a border area that surrounds the active or display area 638 as shown in FIG. 6. In other embodiments, the inactive areas 640 of the display cover 604 may comprise a non-transparent substrate having an opaque material formed therein.

The opaque masking layer 644 disposed on the back surface of the display cover 604 may include one or more openings or light transmissive areas 646 to allow light to pass therethrough. For example, a logo, a design, or other pattern may be formed or defined in the opaque masking layer 644 using light transmissive materials or openings to allow light to pass therethrough so that the light is visible to a passenger of the vehicle. The light transmissive materials may include a colored material or layer to allow light to travel through the material and exit in a colored or white state. In exemplary embodiments, a black masking layer may include a number of openings or light transmissive areas that define patterns, such as charger logo patterns 648 and a logo pattern 650 as shown in FIGS. 6 and 7. The patterns may be illuminated using light emitted by a light source of the panel assembly 608.

As shown in FIG. 7, the display cover 604 may also include one or more apertures or openings 652 to allow access to ports of the interface modules 616 and 618. In exemplary embodiments, the display cover 604 may include a first opening 654 sized to accommodate the port of the interface module 618 and a second opening 656 sized to accommodate the port of the interface module 616. Each of the first and second openings 654 and 656 may have a substantially elliptic shape that corresponds to the shape of the ports of the interface modules 616 and 618 as shown in FIG. 9.

Referring to FIG. 7, the display assembly 606 of the display unit 600 may be configured to display graphical information to a passenger of the vehicle and to detect inputs from the passenger. The display assembly 606 may have a number of layers that include a touch input device or a touchscreen 658, a display panel 660, a backlight assembly 662, and a light source apparatus 664. The touchscreen 658 of the display assembly 606 may be disposed between the display panel 660 and the display cover 604. The touchscreen 658 may detect physical contact or proximity of a finger of a passenger and process the detected information to form electrical signals. The touchscreen 658 may be a resistive touch panel, a capacitive touch panel, an ultrasonic touch panel, an IR touch panel, or any other suitable form of a touch panel. In exemplary embodiments, the touchscreen 658 may include a conductive glass substrate and a conductive film or layer disposed on the glass substrate. A touch sensing unit or circuitry may be coupled to the touchscreen and configured to sense a touch input of the passenger on the touchscreen 658.

The display panel 660 of the display assembly 606 may be disposed between the touchscreen 658 and the backlight assembly 662. The display panel 660 may be configured to display graphical or visual information that may include video, images, and textual information as well as icons, such as user interfaces that may provide information to the user (e.g., text, objects, and/or graphics). The display panel 660 may include a liquid crystal display (LCD) panel or any other suitable display technology. A display driving circuit may be coupled to the display panel for operating the liquid crystal panel. The display driving circuit may be included in the circuitry of the PCB 610.

The backlight assembly 662 of the display assembly 606 may be disposed between the display panel 660 and the PCB 610. The backlight assembly 662 may provide light to the display panel 660 (e.g., the LCD panel) so that graphical information displayed on the display panel 660 can be observed by a passenger of the vehicle. The backlight assembly 662 may include at least one light guide member or plate and one or more reflector plates or members. The light guide member of the backlight assembly 662 may be configured to guide the light emitted from the light source apparatus 664 to the display panel 660. The light guide member may include a transparent material or a colored material and may be made of plastic, glass, acrylic, or other suitable material. The light guide member may be disposed adjacent to the light source apparatus 664 and extend substantially parallel with the longitudinal direction of the light of the light source apparatus 664. As such, the light guide member may be configured to receive light emanating from the light source apparatus 664 in the interior of the light guide member and propagate the light along the length of the light guide member by reflecting the light from the reflector plates. In an exemplary embodiment, the light source apparatus 664 may include a light emitting diode (LED) assembly having a plurality of LEDs. The LEDs may emit colored light or white light.

Figure 11:
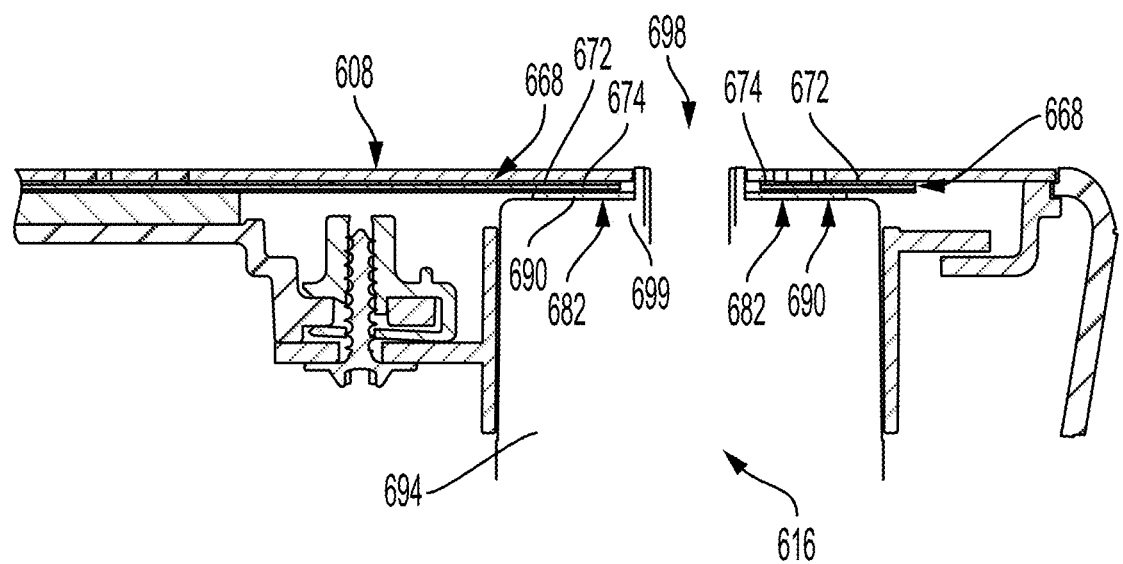
FIG. 11 is a partial cross-sectional view of the display apparatus of FIG. 6 taken along the line A-A, according to example implementations.
Figure 12:
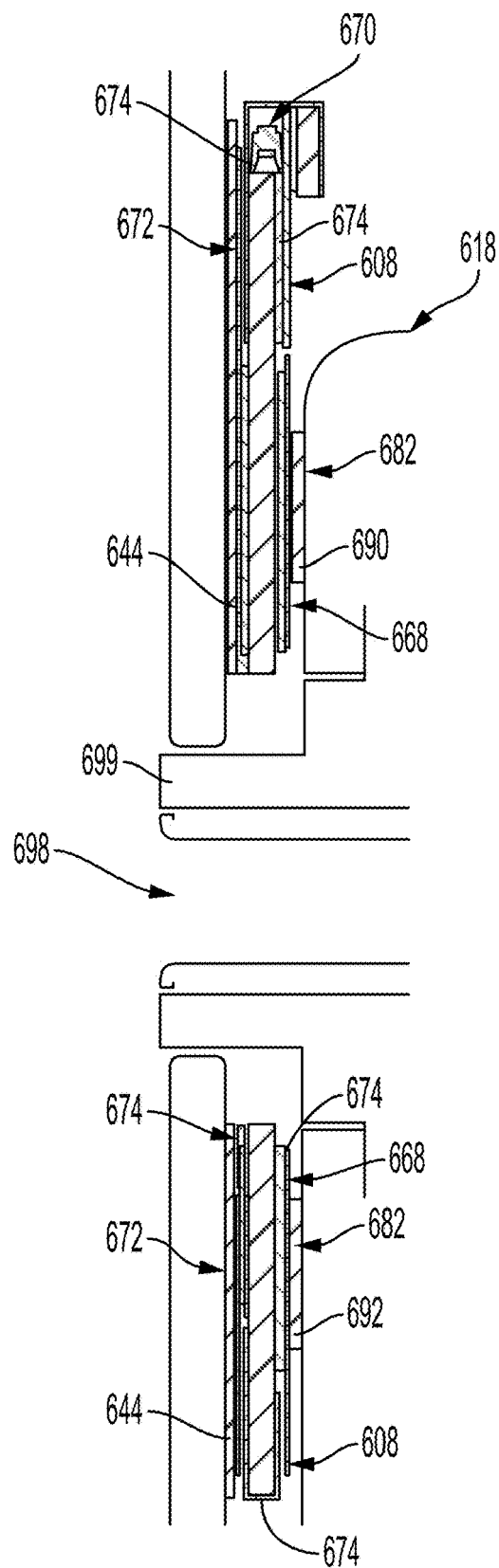
FIG. 12 is a partial cross-sectional view of an interface module of the display apparatus of FIG. 6 taken along the line B-B, according to example implementations.

The panel assembly 608 of the display unit 600 may be located below the display assembly 606 and may be disposed within the space 630 defined in the back cover 624 of the housing 602 as shown in FIG. 8. The panel assembly 608 may be configured to illuminate regions of the display cover 604 including illuminating one or more patterns formed in the display cover 604 as described above. As shown in FIGS. 10-12, the panel assembly 608 may have a number of layers including a backlight assembly 668. The backlight assembly 668 of the panel assembly 608 may be positioned between the masking layer 644 disposed on the display cover 604 and one or more support members or structures as further described below. The backlight assembly 668 may be attached or bonded to the masking layer 644 and may direct light from a light source 670 to the display cover 604.

As shown in FIGS. 10-12, the backlight assembly 668 may include a light guide member 672, one or more reflective plates or members 674. The light guide member 672 may be configured to guide the light emitted from the light source 670 to one or more regions of the display cover 604. The light guide member 672 may include a transparent (e.g., clear) material or a colored material and may be made of plastic, glass, acrylic, or other suitable material. The reflective plates 674 of the light guide member 672 may reflect and guide the light emitted from the light source 670 to one or more regions of the display cover 604. In some embodiments, the reflective plates 674 may comprise color reflective plates to reflect light received from the light source 670 in a colored state. The light that is propagated in the light guide member 672 from the light source 670 may be directed through one or more openings in the reflector plates 674.

As shown in FIG. 12, the light source 670 of the panel assembly 608 may be placed near the top of the backlight assembly 668 so that at least a portion of the light emanating from the light source 670 is coupled into the interior of the light guide member 672 and propagated along the length of the light guide member 672 by reflecting the light from the surfaces of the reflective plates 674. In an exemplary embodiment, the light source 670 may be a light-emitting diode (LED) assembly having a plurality of LEDs. The LEDs may emit colored light or white light.

As shown in FIG. 7, the panel assembly 608 of the display unit 600 may include one or more openings or apertures 676 that allow the ports of the interface modules 616 and 618 to extend therethrough. In exemplary embodiments, the panel assembly 608 may include a first opening 678 sized to accommodate the port of the interface module 616 and a second opening 680 sized to accommodate the port of the interface module 618 as shown in FIG. 10. Each of the first and second openings 678 and 680 may have a substantially elliptical shape that corresponds to the shape of the ports of the interface modules 616 and 618 and corresponds to the openings 652 in the display cover 604. As such, the port of the interface module 616 may be positioned through the first opening 678 and the port of the interface module 618 may be positioned through the second opening 680.

As shown in FIGS. 9 and 10, the display unit 600 may include one or more support or structural members 682 configured to provide support for the backlight assembly 668 of the panel assembly 608. The support members 682 may be positioned behind or adjacent to the backlight assembly 668 of the panel assembly 608. When in a compressed state, the support members 682 may provide compressive forces that may be used to provide and maintain pressure on the backlight assembly 668 to prevent the backlight assembly 668 from becoming detached from the masking layer 644 disposed on the display cover 604. As a result, the support members 682 are configured to support the back light assembly 668 to reduce detachment of the backlight assembly 668 from the mask layer 644 disposed on the display panel 608.

In exemplary embodiments, one or more support members 683 may be disposed between the backlight assembly 668 of the panel assembly 608 and the support pad 632 of the back cover 624. Further, one or more support members may also be disposed between the backlight assembly 668 of the panel assembly 608 and the interface module 616. As shown in FIG. 9, a first support member 685 may be disposed above the port of the interface module 616 and a second support member 686 may be disposed below the port. In other exemplary embodiments, any suitable number of support members may be positioned between the backlight assembly 668 and the first interface module 616, and the support members may be arranged in any suitable manner. Each of the support members 685 and 686 may have a substantially rectangular shape and may comprise a foam material. The foam material may have a thickness of between 0.6-0.75 mm and the distance between the interface module 616 and backlight assembly 668 may be about 0.5 mm.

In exemplary embodiments, one or more support members may be disposed between the backlight assembly 668 of the panel assembly 608 and the interface module 618. As shown in FIGS. 9 and 12, a first support member 690 may be disposed above the port of the interface module 618 and a second support member 692 may be disposed below the port. In other embodiments, any suitable number of support members may be positioned between the backlight assembly 668 and the interface member 618, and the support members may be arranged in any suitable manner. Each of the support members 690 and 692 may have a substantially rectangular shape and may comprise a foam material. The foam material may have a thickness of between 0.6-0.75 mm and the distance between the interface module 618 and backlight assembly 668 may be about 0.5 mm.

In exemplary embodiments, the display unit 600 may include a first interface module (e.g., interface module 616) and a second interface module (e.g., interface module 618). The interface modules 616 and 618 of the display unit 600 are configured to provide power to a device of a passenger and to enable communication between the device and the systems of the vehicle. For example, the ports of the interface modules 616 and 618 may be configured to charge a passenger's device, such as a mobile phone, using a charging or power cord that connects the device to the ports of the interface modules 616 and 618. As such, when the device of the passenger is connected to a port of one of the interface modules 616 and 618, the connected interface module may be configured to supply a low voltage power signal to charge a battery of the device.

The interface modules 616 and 618 may also be configured to enable a device of a passenger to communicate with one or more of the vehicle systems when the device is connected to a port of the interface modules 616 and 618. For example, navigation information from the vehicle systems may be provided to a device of a passenger that is connected to one of the interface modules 616 and 618. As such, when the passenger device is connected to a port of one of the interface modules 616 and 618 via a power cord, the connected interface module may allow both power delivery and data communications to occur between the device and the one or more vehicle systems. Further, the interface modules 616 and 618 may recognize when a plug of a charging cable is placed within a port of the interface modules 616 and 618 and may initiate an exchange of information to enable the vehicle systems to interface with the device.

As shown in FIGS. 7, 9 and 10, each of the interface modules 616 and 618 may include a connector body 694, a connector plug 696, and a port 698 extending from the connector body 694. The interface modules 616 and 618 may be mounted to the back cover 624 of the housing 602 via the brackets 612 and 614 as shown in FIG. 7. The ports 698 of the interface modules 616 and 618 may be accessible through the openings 652 in the display cover 604 of the display unit 600 as described above. Each port 698 of the interface modules 616 and 618 may be configured to receive a plug of a power or charging cable (not shown) of a device of a passenger. Each port 698 of the interface modules 616 and 618 may include a universal serial bus (USB) type port. In exemplary implementations, each port 698 of the interface modules 616 and 618 may comprise a USB Type-C double-sided connector plug with 24-pins. In other implementations, each port 698 of the interface modules 616 and 618 may be any type of standardized port.

Referring to FIG. 9, a light diffusing member 699 may be disposed around each port 698 of the interface modules 616 and 618. The light diffusing members 699 may be configured to diffuse the light provided by the backlight assembly 668 of the panel assembly 608 as described above. The light diffusing members 699 may be composed of a transparent or colored acrylic resin or rubber. In one embodiment, the light diffuser members 699 may be substantially elliptical shaped with a flange extending around the outer surface at one end. The light diffusing member 699 may be configured to illuminate an outline of each port 698 on the display cover 604 of the display unit 600 in response to light received from the backlight assembly 668.

As shown in FIG. 7, the printed circuit board (PCB) 610 of the display unit is disposed between the backlight assembly 662 of the display assembly 606 and the back cover 624 of the housing 602. The PCB 610 may be connected to the display panel 660 and other components of the display unit 600. The PCB 610 may include a processor, memory for storing data and instructions, and other components to implement the functions of the display unit 600.

The above detailed description describes various features and functions of the disclosed systems and devices with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. An apparatus comprising:
   a display cover;
   a housing configured to support the display cover;
   a backlight assembly configured to provide light to at least a portion of the display cover;
   a masking layer disposed between the backlight assembly and the display cover;
   a first interface module having a connector body and a port extending from the connector body, wherein the port of the first interface module extends at least through the backlight assembly; and
   a first support member disposed between the connector body of the first interface module and the backlight assembly.

2. The apparatus of claim 1, wherein the port of the first interface module is accessible via a first aperture formed in the display cover, and wherein the port of the first interface module extends through the masking layer.

3. The apparatus of claim 1, further comprising a first diffusing member disposed around the port of the first interface module, wherein the first diffusing member is configured to receive light from the backlight assembly.

4. The apparatus of claim 1, wherein the first interface module is configured to provide a low voltage DC charging signal.

5. The apparatus of claim 1, further comprising:
   a second interface module having a connector body and a port extending from the connector body; and
   a second support member disposed between the connector body of the second interface module and the backlight assembly.

6. The apparatus of claim 5, wherein the port of the first interface module comprises a universal serial bus (USB) port and the port of the second interface module comprises a USB port.

7. The apparatus of claim 5, wherein the port of the second interface module is accessible via a second aperture formed in the display cover, and wherein the port of the second interface module extends at least through the backlight assembly and the masking layer.

8. The apparatus of claim 5, wherein the first and second supporting member each comprise a foam material.

9. The apparatus of claim 5, further comprising a second diffusing member disposed around the port of the second interface module, wherein the second diffuser member is configured to receive light from the backlight assembly.

10. The apparatus of claim 1, wherein the backlight assembly comprises a first reflective plate, a second reflective plate, and a light guide member disposed between the first and second reflective plates, and wherein the second reflective plate is attached to the masking layer.

11. The apparatus of claim 10, wherein the first and second reflective plates each comprise a colored reflector plate.

12. The apparatus of claim 1, further comprising a third support member, and wherein the third support member is disposed between a backwall of the housing and the backlight assembly.

13. The apparatus of claim 12, wherein the third support member comprises a foam material.

14. The apparatus of claim 1, wherein the display cover comprises a glass substrate, and wherein the masking layer is disposed on a surface of the glass substrate.

15. The apparatus of claim 1, wherein the display cover includes a display area and an opaque area surrounding the display area, and wherein the opaque area defines a first light transmissive pattern and a second light transmissive pattern.

16. The apparatus of claim 1, further comprising:
   a display area configured to display an image; and
   a touch screen configured to detect touch input.

17. The apparatus of claim 1, wherein the masking layer comprises an opaque material surrounding an opening, and wherein the opaque material includes at least one pattern defined in the opaque material.

18. The apparatus of claim 1, further comprising a light source configured to provide light to the backlight assembly, wherein the light source is disposed adjacent to the backlight assembly.

19. The apparatus of claim 1, where the housing is affixed to a portion of an interior of a vehicle.

20. A display apparatus comprising:
   a display cover;
   a housing to support the display cover;
   a backlight assembly to direct light to a least a portion of the display cover;
   a masking layer disposed between the display cover and the backlight assembly;
   a first interface module having a connector body and a port extending from the connector body, wherein the port of the first interface module extends at least through the backlight assembly; and
   means for supporting the backlight assembly disposed between the connector body of the first interface module and the backlight assembly.

* * * * *